No. 810,140. PATENTED JAN. 16, 1906.
H. HAGER.
COFFEE COOLER.
APPLICATION FILED SEPT. 27, 1905.
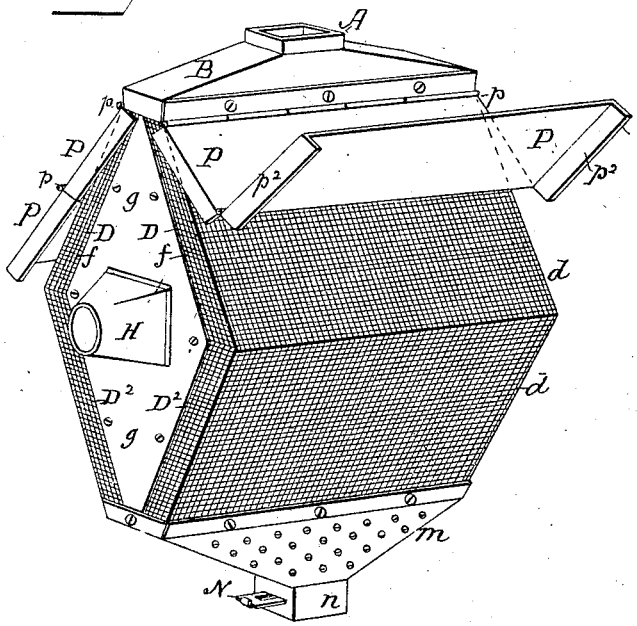
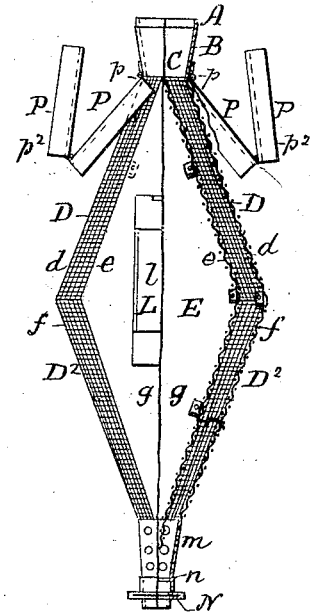
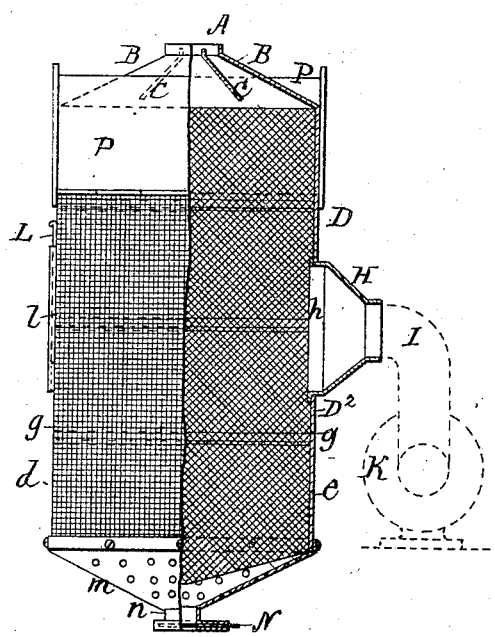
WITNESSES
Harry L. Amer.
E. E. Masson
INVENTOR
Harry Hager
by Jay D. Miller
ATTY.

UNITED STATES PATENT OFFICE.

HARRY HAGER, OF CHICAGO, ILLINOIS.

COFFEE-COOLER.

No. 810,140.     Specification of Letters Patent.     Patented Jan. 16, 1906.

Application filed September 27, 1905. Serial No. 280,367.

*To all whom it may concern:*

Be it known that I, HARRY HAGER, a citizen of the United States, residing at Chicago, in the county of Cook and State of Illinois, have invented certain new and useful Improvements in Coffee-Coolers, of which the following is a specification.

This invention relates to an apparatus for cooling grain, and especially coffee, and has for its objects to produce a simple and efficient device for economically and rapidly cooling fresh roasted coffee through the medium of a current of air sucked in through said coffee; but it can also be used for cooling and drying other grain by a current of air. I attain these objects by the construction illustrated in the accompanying drawings, in which—

Figure 1 is a perspective view of the main portion of the apparatus. Fig. 2 is a vertical view showing on the left-hand side an end view and on the right-hand side a vertical section of the apparatus, taken in the opposite end to that shown in Fig. 1. Fig. 3 shows on the left-hand side a front elevation and on the right-hand side a vertical section of the apparatus constructed in accordance with my invention.

In said drawings, A represents a quadrangular spout (which may be of other form) generally leading from a floor above, where grain may be stored or where coffee-roasters may be located, but not shown in the drawings. The spout A leads the coffee into the top of a pyramidal funnel B, in which are a series of inclined baffle-plates C to direct portions of the descending coffee toward the ends of the apparatus to render the flow as evenly as possible across the apparatus. The coffee falls into two outwardly divergent but inclined passages D, which lead about halfway down the apparatus into two inwardly convergent but inclined passages $D^2$. The walls of said passages consist of foraminous material, as wire-netting, having fine meshes, the outer walls being shown at $d$ and the inner walls at $e$. The sides $f$ of said passages are also of wire-netting, but the end walls $g$ are of imperforate sheet metal. In one of the end walls $g$, about the center thereof, there is a large perforation $h$, which is capped by a pyramidal funnel H, the small end of which leads into a pipe I, (shown in dotted lines in Fig. 3,) and said pipe I leads into the eye of a suction-fan K from the diamond-shape air-chamber E in the center of the apparatus. The opposite end wall $g$ is provided with an opening $l$ to have access to the interior and clean it occasionally. Said opening is normally closed by a door L, which is preferably a vertically-sliding door. The pyramidal top and the bottom hopper $m$ are each one preferably made of sheet metal to give stiffness to the frame; but said bottom has a series of fine perforations for the passage of air. In the lower end of the hopper $m$ there is a tubular passage $n$, which is controlled by a horizontally-sliding gate N to regulate the escape of the issuing grain. To prevent the sucked air from passing through the meshes of the walls of the upper divergent passages D when said passages are comparatively empty in the beginning of the operation, or if the stream of grain is not sufficient to fill said passages D, the upper portion of the apparatus is provided with shutters P, formed of two horizontal leaves hinged from their upper edge $p$. Said shutters have downwardly-bent ends $p^2$ to cover the sides $f$ of said passages; but they can be folded and elevated out of the way when the passages D are full of grain.

One advantage gained by having the passages D $D^2$ inclined in place of vertical passages is that the grains of coffee in contact with the wire meshes are slightly arrested and caused to turn over, particularly when they reach the junction of the passages D and $D^2$, and thus each grain is subjected to a current of air on more than one of its sides.

Apparatus thus constructed can be joined in series of four or six, more or less, and can be connected together to the eye of the same fan; but each apparatus is under the discharge end of a coffee-roasting cylinder. After the coffee has been sufficiently cooled the sliding bottom gate N is opened and the coffee is allowed to fall into suitable receivers.

Having now fully described my invention, I claim—

1. In an apparatus of the class described, the combination of a leading-in spout and pyramidal funnel with inclined baffle-plates therein, downwardly-divergent and then convergent walls of fine wire-netting to form zigzag passages, a hopper into which said passages lead, the inner walls forming an air-chamber between said zigzag passages, and an air-pipe issuing from the middle portion of one end of said air-chamber, substantially as described.

2. In an apparatus of the class described, the combination of an upper funnel and inclined baffle-plates therein, a bottom hopper and a gate to control it, and between said upper funnel and bottom hopper, the wire-netting walls of two zigzag passages leading downwardly from said funnel into the bottom hopper, the walls of a diamond-shape air-chamber in the center, an air-pipe issuing from one side of said air-chamber, and a door in the opposite side, substantially as described.

3. In an apparatus of the class described, the combination of an upper funnel and inclined baffle-plates therein, a bottom hopper and a gate to control it and between said upper funnel and bottom hopper, the wire-netting walls of two divergent and then convergent passages leading downwardly from said funnel to the bottom hopper and foldable shutters hinged to rest upon the walls of the divergent passages, substantially as described.

In testimony whereof I affix my signature in presence of two witnesses.

HARRY HAGER.

Witnesses:
    JAY D. MILLER,
    ALBERT G. HUBBARD.